United States Patent [19]
Talis et al.

[11] 3,924,996
[45] Dec. 9, 1975

[54] ROTARY TABLET-MAKING MACHINE

[76] Inventors: Nikolai Semenovich Talis, ulitsa Zhelyabova, 13, kv. 28; Anatoly Illarionovich Jursakov, ulitsa Zhelyabova, 13, kv. 32, both of Angarsk, Irkutskoi oblasti, U.S.S.R.

[22] Filed: Nov. 19, 1973

[21] Appl. No.: 416,944

[52] U.S. Cl................................ 425/348 R; 425/355
[51] Int. Cl.²............................................. B29C 3/00
[58] Field of Search ........... 425/435, 434, 355, 348, 425/350, 801, 809, 803, 261, 804

[56] References Cited
UNITED STATES PATENTS

| | | | |
|---|---|---|---|
| 2,973,555 | 3/1961 | Schwepke............................ | 425/801 |
| 3,384,035 | 5/1968 | Gabriel et al.................... | 425/355 X |
| 3,408,963 | 11/1968 | Alexander, Jr. et al. ........ | 425/355 X |

*Primary Examiner*—Robert L. Spicer, Jr.
*Attorney, Agent, or Firm*—Haseltine, Lake & Waters

[57] ABSTRACT

A rotary tablet-making machine comprises a rotor which consists of two coaxially arranged upper and lower assemblies separated by a counter-die table and having circumferentially spaced bores accommodating respective upper and lower plungers which are mounted parallel with the rotor axis and are made to reciprocate during the rotation of the rotor under the action of upper and lower cams. An annular groove is provided in a cylindrical body of each plunger, which groove has tapered end walls, while an annular recess is made in each rotor assembly to extend over a fraction of the height thereof, which corresponds to the amount of the axial movement of the plungers. The cams are mounted on a support land formed by each annular recess in the body of each rotor assembly in such a manner that the working surface of the cams cooperate with the surfaces of the annular grooves during the rotation of the rotor so that the surfaces of the grooves do not leave the bores that accommodate the plungers.

1 Claim, 3 Drawing Figures

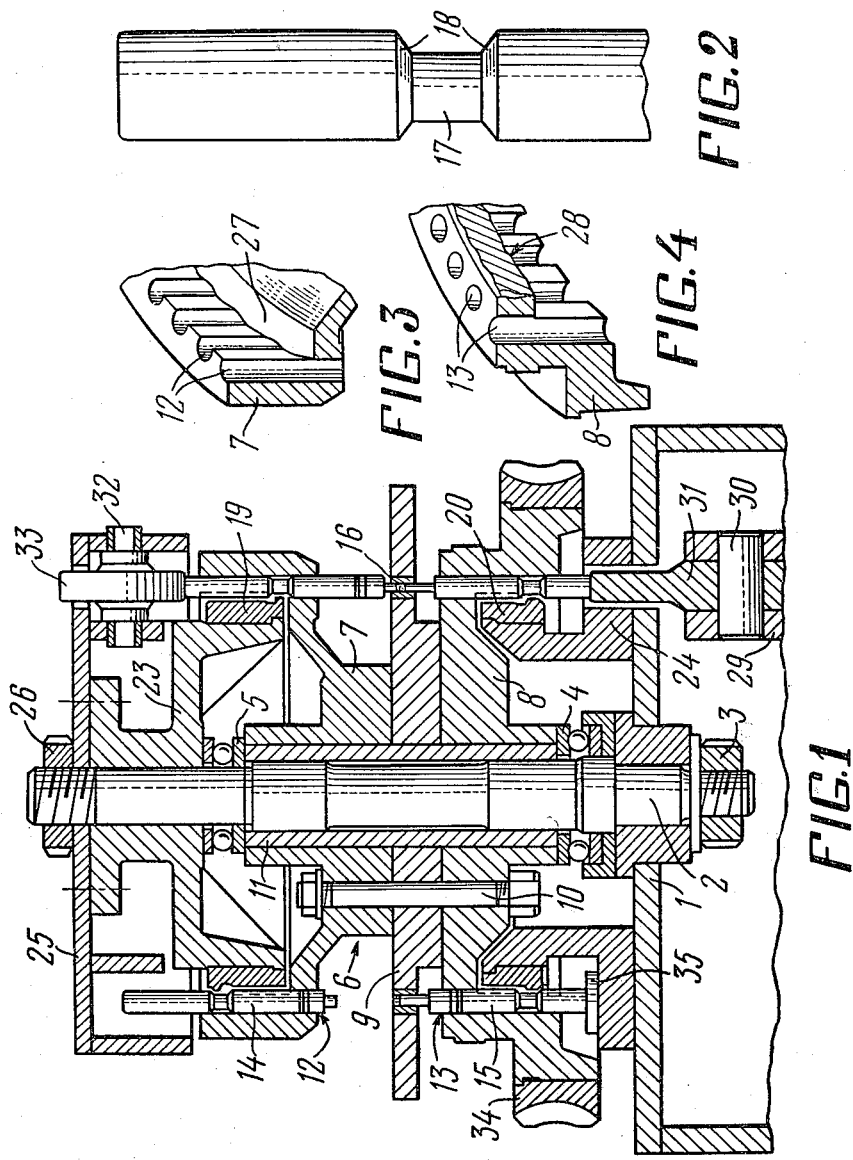

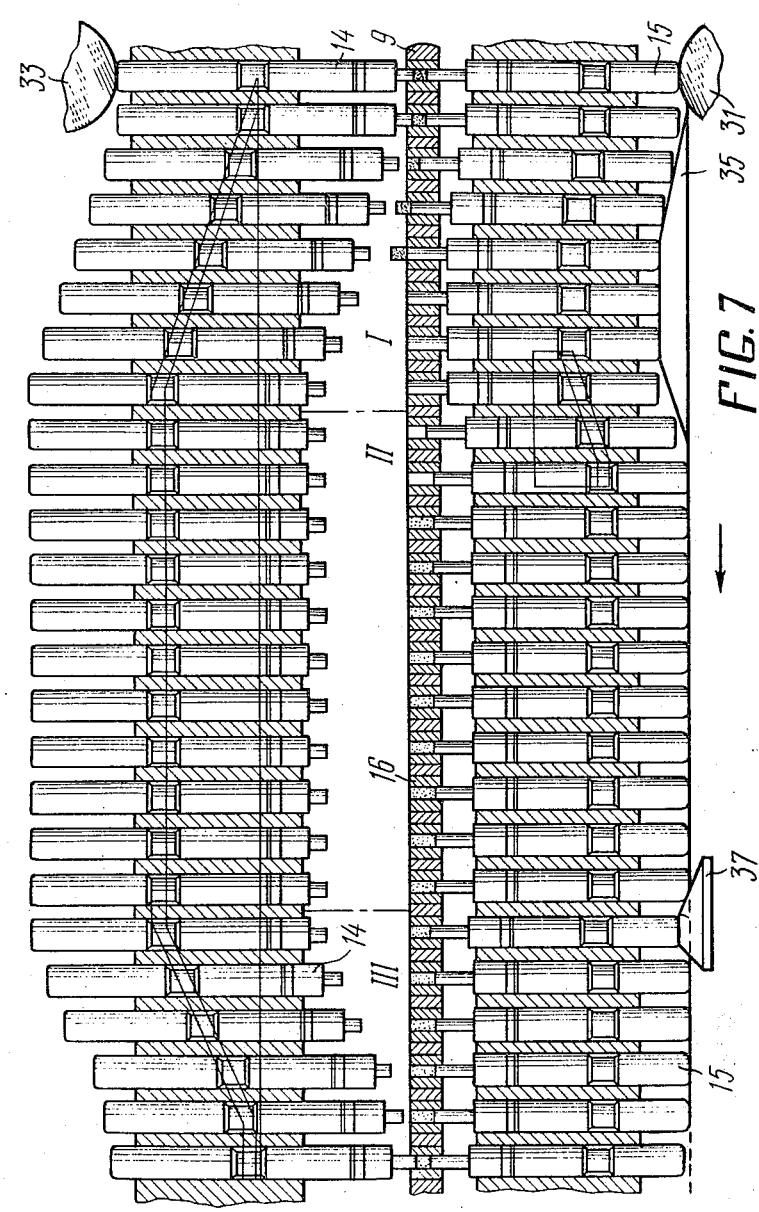

ROTARY TABLET-MAKING MACHINE

The present invention relates to press-moulding machines, and more particularly to a rotary tablet-making machine for compressing catalysts used in the chemical industry.

Known rotary tablet-making machines comprise a rotor consisting of two coaxially arranged assemblies separated by a counter-die table. The assemblies are provided with bores accommodating upper and lower plungers, the heads of the plungers extending through these bores. The plungers are caused to reciprocate by means of cams fixed to the base. During the rotation of the rotor of the machine the tapered surfaces of the plunger heads cooperates with the working surfaces of the cams.

In such machines the surface of each plunger head in contact with the respective cam is tapered, and the working surfaces of the cams is shaped as a tapered helical surface in the zones corresponding to the lowering and lifting movement. Since the lifting and lowering cams used in such machines have substantial pitch angles (15°–25°), there is such an increase in the force urging the plungers away from the cams, upon the appearance of a resistance to the plunger movement, due to clogging of the bores of the rotor and counter dies with the powder being treated, that the plungers are bent so that they cease to be in contact with the cams.

The following measures have been contemplated to eliminate this disadvantage. The cross-sectional area of the plunger rods is selected to be several times greater than that required, based upon the calculated pressing force, while the length of the guide bores in the rotor is respectively increased, and the cams are made two-sided. An increased cross-sectional area of the plunger rod results in a reduced number of the plungers that can be accommodated in the rotor, and hence in a lower productivity. The use of the two-sided cams results in a more complicated structure and makes impossible the rotation of the plungers about their axes which brings about a rapid wear of the plunger heads, and the wear can be reduced only by using a lower rotational speed of the rotor, whereby the productivity of the machine is accordingly reduced.

It is an object of the present invetnion to eliminate the above disadvantages.

Another object of the invention is to improve wear resistance of the plungers.

Still another object of the invention is to provide a plunger construction which makes it more simple in manufacture.

A further object of the invention is to improve the reliability of the rotary tablet-making machine.

The above objects are accomplished in that a rotary tablet-making machine is provided which comprises a rotor consisting of two coaxially arranged respectively upper and lower assemblies separated by a counter-die table and provided with circumferentially spaced bores accommodating respectively upper and lower plungers mounted therein parallel with the rotor axis, the plungers reciprocating during the rotation of the rotor under the action of upper and lower cams fixed to the base and having tapered helical working surfaces acting upon portions of the plungers to reciprocate the latter in the axial direction.

According to the invention the cylindrical body of each plunger is provided with an annular groove having tapered end walls, the groove being adapted to ensure cooperation of the plungers with stationary cams, and an annular recess is made in each rotor assembly, extending over a fraction of its height, corresponding to the amount of the axial movement of the plunger, so as to form in the rotor assembly body a support land which mounts the cams, whereby the working surfaces of the cams cooperate with the surfaces of the annular groove during the rotor movement, so that the surfaces of the grooves do not leave the bores that accommodate the plungers.

The construction of the plungers according to the invention and the relative arrangement of the plungers and cams in the rotor body enable a reduction of the bending moments that act upon the plungers during their engagement with the cams.

The invention will now be described in detail with reference to a specific, exemplary embodiment of the rotary tablet-making machine illustrated in the accompanying drawings, in which:

FIG. 1 shows a longitudinal section of the rotary tablet-making machine according to the invention;

FIG. 2 is a plunger of the machine according to the invention;

FIG. 3 is a partial perspective view of an annular recess made in an upper assembly of a rotor;

FIG. 4 is a partial perspective view of the annular recess made in a lower assembly of the rotor;

FIG. 7 is a cyclogram of the operation of the rotary tablet-making machine.

Figure 5:
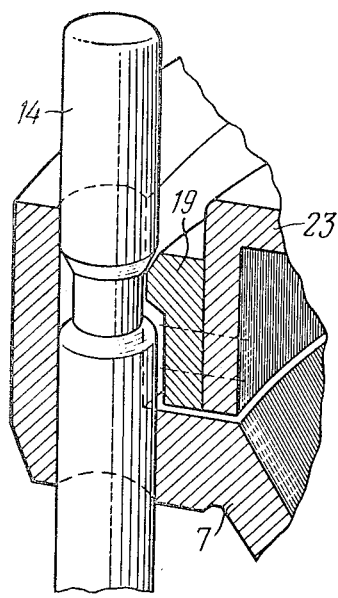
FIG. 5 is a detail A in FIG. 1 (perspective view)
Figure 6:
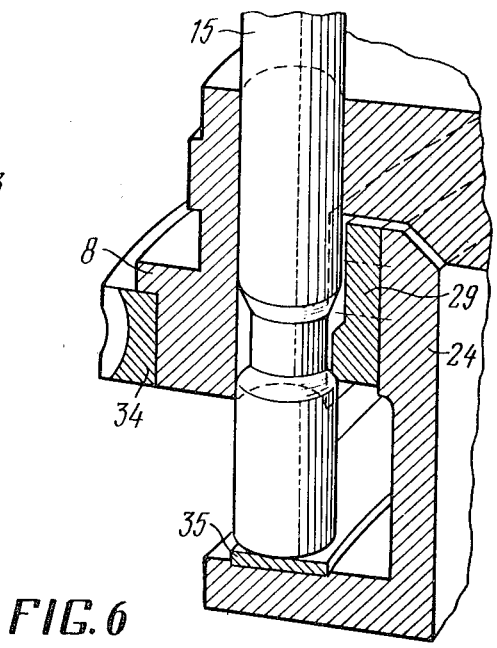
FIG. 6 is detail B in FIG. 1 (perspective view)

The exemplary rotary tablet-making machine according to the invention comprises a base 1 (FIG. 1) which is welded of steel members. A central hole of the base 1 accommodates a central column 2 which is fixed at the bottom portion by means of a nut 3.

Journalled in thrust bearings 4, 5 on the column 2 is a rotatable rotor 6. The rotor 6 consists of upper and lower assemblies 7, 8 of moulded pig iron, which are separated by a steel counter-die table 9. The upper and lower assemblies 7, 8 and the counter-die table 9 are interconnected by means of fitted bolts 10. A sliding bearing 11 is press-fitted into the rotor 6 and is mounted on the column 2 together with the assembled rotor.

Mutually coaxial circumferentially spaced bores 12, 13 are made in the upper and lower assemblies 7, 8 to accommodate upper and lower plungers 14, 15. Counter dies 16 are mounted in the counter-die table 9. The upper and lower plungers 14, 15 (FIGS. 1, 2) comprise cylindrical rods of a high-tensile steel, each having in the intermediate portion thereof an annular groove 17 with tapered end walls 18. During the rotation of the rotor 6 the upper and lower plungers 14, 15 reciprocate under the action of upper and lower cams 19, 20 which act with their projections 21, 22 on respective engaging surfaces of the tapered end faces of the plungers. The cams are disposed in an annular slot adjoining the bores 12, 13, as can be seen from FIG. 1.

The upper cams 19 are mounted on a ring 23 fixed by bolts to a traverse 25, and the lower cams 20 are mounted on the ring 24 fixed to the base 1. The traverse 25 with the ring 23 is mounted on the column 2 and is fixed by means of a nut 26. The traverse 25 and the base 1 are interconnected by means of tie columns (not shown) and form the base assembly of the rotary tablet making machine.

The upper and lower assemblies 7, 8 of the rotor (FIGS. 3, 4) are provided with small annular recesses 27, 28 in the form of internal cavities made by boring the inner cylindrical surface to the depth corresponding to the amount of the allowed reciprocatory movement of the plungers. The small annular recess in the body of each assembly forms a horizontal support land as shown in FIGS. 3, 4.

The annular recesses 27, 28 are made in the rotor assemblies in such a manner as to cut down the bores 12, 13 over a major fraction of the assembly height. The presence of the annular recesses ensures contact at all times between the tapered end faces 18 of the grooves 17 of the plungers 14, 15 with the tapered helical surfaces of the cams 19, 20.

As shown in FIG. 1, the upper and lower cams 19, 20 are mounted on the support lands of the annular recesses 27, 28 so that the annular grooves 18 of the plungers 14, 15 do not leave the bores 12, 13 during the reciprocatory movement.

One end of a traverse 29 supporting on its axis 30 a lower pressing roller 31 of high-tensile steel is pivotally fixed to the base 1, and the other end of the traverse rests against a pressure stabilizer secured to the base 1 (the stabilizer not being shown in the drawings).

Mounted on the traverse 25 by means of an axle 32 is an upper pressing roller 33 made of high-tensile steel.

The rotor 6 is rotated by a mechanical drive (not shown) through a worm reduction gear 34.

Mounted on the horizontal surface of the ring 24 are stationary cams 35, 37 serving for batching of the powder in the die 16, expulsion of the pressed tablets from the die 16, their removal from the counter-die table 9, as well as for lowering of the lower plungers 15.

FIG. 7 shows a cyclogram of the operation of the rotary tablet-making machine. During the rotation of the rotor 6 the upper and lower plungers 14, 15 cooperate with the upper and lower cams 19, 20 to perform reciprocatory movement.

In zone I the upper and lower plungers 14, 15 run between the upper and lower pressing rollers 33, 31 to compress in the die 16 a tablet 36 of a catalyst powder. Then the upper plungers 14 leave the die 16 in the zone corresponding to the lifting of the upper cams 19. At the same time the lower plungers 15 push out the compressed tablet in the expulsion zone of the lower cams 35, while in a subsequent flat zone the tablets are taken off the counter-die table 9.

In zone II the upper plungers 14 are in the uppermost position. The lower plungers 15 are lowered under the action of the lower cams 20, 35 to expose the bores of the dies 16 for filling them with the powder. A charging device (not shown) of any known design fills the cavities of the dies 16 with the powder.

In zone III the lower plungers 15 cooperate with the batching cam 37 to batch the powder in the die 16. The upper plungers 14 are lowered under the action of the upper cams 20. Now the batched quantity of the powder in the die 16 enclosed between the end faces of the upper and lower plungers 14, 15 can be compressed, as explained before.

Thus, in the zones I and III the upper and lower plungers 14, 15 engage with their tapered end walls 18 (see FIG. 7) the tapered helical surfaces 21 of the upper and lower cams 19, 20. It should be noted that the portions of the cylindrical surfaces of the plungers 14, 15 adjacent to the annular grooves 17 having the tapered end walls 18 do not leave the bores 12, 13 of the rotor 6.

The force urging the plungers 14, 15 away from the working surface of the upper and lower cams 19, 20 is disturbed over the entire length of the bores 12, 13 (see FIGS. 2, 3), thereby reducing the bending moment which would otherwise load the body of the plungers 14, 15, whereby a reliable contact is ensured between the plungers 14, 15 and the upper and lower cams 19, 20.

Due to the above-mentioned advantages the plungers can be made with a smaller cross-sectional area so as to accommodate a greater number of plungers in a rotor of a given diameter. In addition, the construction of the rotary tablet-making machine according to the invention enables unobstructed rotation of the plungers about their axes so that eventual clogging of the guide bores is eliminated, whereby the rotational speed of the rotor can be increased to improve productivity of the rotary tablet-making machine.

We claim:

1. A rotary machine for pressing small tablets from powdery substances, comprising in combination: a base carrying a central column; a rotor journalled in said base and consisting of two juxtaposed, coaxially arranged, respectively upper and lower assemblies separated by a counter-die table and having respective body portions; a lower ring member fixed to said base, and a symmetrically disposed but juxtaposed upper ring member supported by said base through the intermediary of said column; said ring members defining circumferentially arranged, symmetrical bores and annular slots encircling said bores from within; upper and lower plungers mounted substantially parallel with the rotor axis, accommodated in said bores, and having cylindrical bodies provided with substantially central annular grooves having tapered end walls and respective engaging surfaces midway of said plungers; upper and lower cams accommodated in the respective assemblies within said annular slots, and having tapered helical working surfaces acting upon said engaging surfaces of the plungers to axially reciprocate the latter from within; said assemblies being provided with small annular recesses in the regions of said bores, extending over a fraction of the height of the respective assembly, corresponding to the limited amount of axial movement allowed for said plungers, said cams being mounted on support lands in said body portions of the rotor assemblies, formed by said annular recesses; said cams and said plungers being arranged so that said cam working surfaces cooperate with surfaces of said annular grooves; said annular slots, said cams therein, and said small annular recesses of the assemblies constituting means for limiting the axial movement of said plungers so that said surfaces of the annular grooves do not pass beyond said bores that accommodate said plungers during their reciprocation.

* * * * *